…

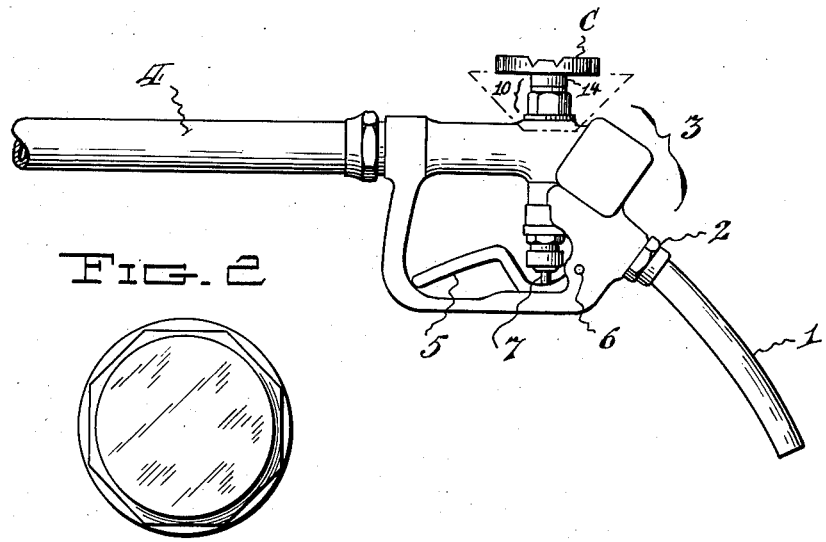
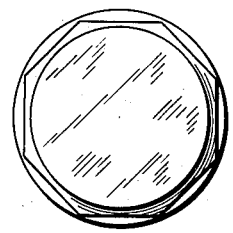
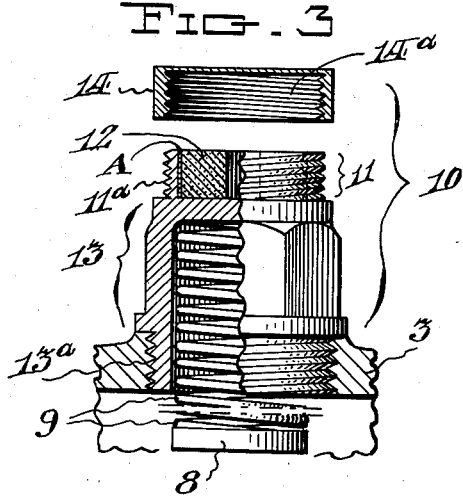
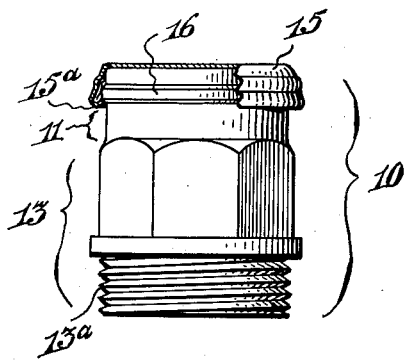
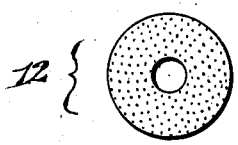

United States Patent Office 2,982,318
Patented May 2, 1961

2,982,318
MAGNETIC HOLDING DEVICE FOR GASOLINE TANK CLOSURE CAPS AND THE LIKE

Thomas J. Ferreri, 917 Washington St., Reading, Pa.

Filed July 14, 1958, Ser. No. 748,361

2 Claims. (Cl. 141—98)

This invention generally relates to gasoline discharging nozzle devices which form part of the gasoline pump arrangements commonly utilized at gasoline dispensing stations, and more particularly concerns a novel nozzle device of this type which integrally embodies a unique magnetic part, or structure, that functions to conveniently hold an automobile gas tank cap on said device at a conspicuous location best suited to positively remind the gas station attendant to replace the cap after a gas tank filling operation has been performed.

One object of my invention is to provide a novel gasoline discharging nozzle device of the type indicated.

Another object is to provide such a device which has certain structural and functional features of advantage over the similar devices of the prior art.

A further object is to provide a novel magnetic unit, or structure, that is adapted to be united with a nozzle device of the type indicated so as to form an integral part thereof in such manner that the unit serves to conveniently hold an automobile gas tank cap on said device, and which unit can also be readily modified to serve a similar, or a different purpose, when cooperatively associated with some other device.

An additional object is to provide such a nozzle device having a permanent magnet mounting structure integrally united with one of the elements, or parts, of the device.

Another object is to provide such a nozzle device having a hollow valve spring seating nut that is provided with integral mounting means for a permanent magnet.

Another feature of the invention resides in the provision of a magnetic unit that can be readily combined with a nozzle device of the type indicated, so as to form an integral and permanent twofold purpose serving part of such device, and which unit can also be adapted for combination with some other device so as to serve a similar, or a different purpose.

Other objects are, to provide in combination with a nozzle device of the type indicated having a tubular gasoline flow directing member and a combined handle and valve member; of a mounting structure for a permanent magnet which structure is at least integrally united with one of said members, a permanent magnet mountedly associated with said structure so that the magnetic force thereof will act to separably hold an automobile gas tank cap on the device; which magnet mounting structure, in one form thereof, can be integrally united with the valve spring seating unit of the nozzle device and provided with one or more novel features, such as a magnet inserting opening at one end thereof and a closure cap adapted to be separably connected with said structure so as to close the open end thereof and thereby protect the magnet.

With these and other objects in view, which will become more readily apparent from the following detailed description of the practical and illustrative embodiments of the unique improvements shown in the accompanying drawings, my invention comprises the novel gasoline dispensing nozzle device, elements, units, features of construction and arrangement of parts in cooperative relationship as more particularly indicated and defined by the hereto appended claims.

In the accompanying drawings:

Figure 1 is a side elevational view of one form of gasoline discharging nozzle device in accordance with my invention.

Fig. 2 is an enlarged top plan view of a certain magnetic unit which forms part of my invention.

Fig. 3 is an exploded elevational view of a portion of the combined handle and valve assembly of the nozzle device, as indicated by the dot-and-dash outline shown in Fig. 1, which portion is partly broken away and in section so as to disclose certain structural details.

Fig. 4 is a top plan view of one form of a permanent magnet that constitutes a part of my invention.

Fig. 5 is a side elevational view of the permanent magnet shown in Fig. 4, and

Fig. 6 is a side elevational view of a modified form of unit that forms part of my invention, the unit being partly broken away so as to disclose the complementary type means associated with certain parts of the unit to effect a separable snap-on connection therebetween.

It will facilitate an understanding of my invention to first briefly consider certain prevailing circumstances that are relevant thereto, so that these may be kept in mind when subsequently reading the detailed description of the development here involved, as well as to enable a proper appreciation of the practical aspects and phases thereof.

Accordingly, it is noted that attendants of modern gasoline dispensing service stations, after filling the gasoline tanks of automobiles with a conventional nozzle device, sometimes inadvertently fail to replace the closure cap of the tank which has been serviced. This inadvertency may result from forgetfulness on the part of the attendants, or may be due to a more or less inattentive, or irresponsible cap restoring practice prevailing in a particular instance. At any rate, such inadvertency not only brings about the loss of the tank cap for the automobile owner and involves a replacement cost for the service station, but in general constitutes a source of annoyance and leads to consequent troublesome conditions for the motoring public. To overcome this detrimental situation, various corrective measures and devices have heretofore been proposed. However, none of these, to my knowledge, have proven satisfactory, or successful, perhaps mainly for practical reasons.

To overcome the said detrimental situation in a practical, effective and efficient manner, my invention provides magnetic means that is integrally united with the gasoline dispensing nozzle device and adapted to conveniently, as well as firmly hold a gasoline tank cap on the device in separable manner, at such a conspicuous location that the attendant cannot fail to be positively reminded to replace the same after completion of the tank filling operation. The said conspicuous location is indicated by the dot-and-dash outline shown in Fig. 1 of the drawings, which latter also discloses a ferrous metal automobile gasoline tank closure cap C held in position at said location on the nozzle device.

Referring to the drawings, in which similar reference characters designate corresponding parts, Fig. 1 shows a standard, or conventional, gasoline dispensing nozzle device of modern design, construction and operation, which embodies my invention. The usual parts of such a device generally comprises a tubular gasoline flow directing member 1, that is separably joined at 2 with a combined handle and valve assembly 3. The component parts of the member 1 and assembly 3, as usual, are substantially all made of brass or some other non-ferrous metal. The nozzle device is attached to a flexible hose 4 that leads to a conventional type gasoline pump arrangement of a gasoline dispensing service station, all in accordance with the well known modern practice. As usual, the nozzle device is properly grounded for safety purposes, in accordance with the Underwriters requirements, by a ground wire connection in the flexible hose 4, between the nozzle device and pump structure arrangement.

Since the construction and operation of the nozzle device shown in Fig. 1 is well known, only those parts thereof are disclosed, or indicated, which will make it clear how my invention is cooperatively associated therewith.

The combined handle and valve assembly 3 generally comprises a usual valve operating element 5, that is pivotally mounted at 6, so as to be vertically reciprocal to thereby effect the actuation of the usual stem 7, that operates the valve structure (not shown), arranged within the assembly 3, all in accordance with the well known nozzle device construction and operating practice whereby the nozzle device can be operated to effect a measured flow of gasoline from the hose 4 through and from the flow directing member 1 to the tank of an automobile.

At its upper end, the stem 7 has fixedly combined therewith a valve element 8 (partly shown in Fig. 3) on which rests a compression or valve spring 9, that is usually seated in a standard type plain hollow brass nut the lower end of which is provided with an externally threaded portion, so that the nut can be readily secured in its intended position at the upper end of the assembly 3, in a correspondingly internally threaded opening formed at this location in the assembly 3. By removing the said nut from the assembly 3, access may be had to the valve parts operatively located within the assembly 3 below said opening.

In accordance with my invention, there is provided a magnetic unit which is generally indicated by the numeral 10 and includes an integral brass structure having an upper section 11, which serves as a mounting arrangement for a circularly-shaped permanent magnet 12, a lower section 13 that is formed in correspondence with the standard type hollow valve spring seating nut previously referred to, and a separate closure cap element 14 that is separably attachable to the section 11 in such manner as to protectingly cover the upper surface of the magnet 12.

The cap element 14 is of circular configuration and formed of brass, or some other non-magnetic material, such as a suitable plastic material, and is provided with an internally threaded portion 14ª for cooperative engagement with a correspondingly externally threaded portion 11ª formed on the upper section 11 of the integrally formed structure consisting of the sections 11 and 13.

The lower section 13 of the said integrally formed structure is provided with an external thread 13ª for cooperative engagement with the usual correspondingly internally threaded portion of the opening formed in the assembly 3, in which the previously referred to plain hollow valve spring seating nut is ordinarily mounted. In other words, the lower section 13 of the said integrally formed structure is made in substantial correspondence with the usual plain hollow valve spring seating nut, so that it constitutes a duplicate substitute for the latter when applied to the combined valve and handle assembly 3 of the nozzle device, as clearly illustrated by Fig. 3. When so mounted, the spring 9 is seated within the cavity or hollow portion of the section 13 of the said integral structure, in exactly the same manner as when the usual plain hollow valve spring seating nut is applied to the nozzle device, as previously explained.

When the cap element 14 is applied to the upper section 11, the top wall formation of the cap element 14 contactingly rests against the upper surface of the magnet 12, and the latter is consequently protected against injury when a ferrous metal automobile gasoline tank cap C, shown in Fig. 1, is placed against the top surface of the cap element 14 so as to be held thereagainst by the magnetic force of the magnet 12. In order that a substantially maximum magnetic holding force may be exerted by the magnet, the top wall formation of the cap element 14 is preferably made quite thin and in the order of .001 to .010 of an inch in thickness, but this wall thickness can, of course, be varied as desired so as to attain best cap holding results by the magnet 12.

The permanent magnet 12 is preferably of the ceramic type made and sold by The Indiana Steel Products Company of Valparaiso, Indiana, under the name "Index I" permanent magnets. For detailed information concerning the construction and characteristics of such permanent magnets reference may be had to "Index Bulletin No. 18" and other literature published for free distribution by the said company and to the patents which have been obtained by the latter on such magnets. The Index I permanent magnet shown in Figs. 3, 4 and 5 is of the multiple pole type, i.e., it is provided with a plurality of magnetic poles, or areas, that are circularly arranged in relatively spaced relation about the center of the ring-shaped magnetic formation illustrated for practical exemplification of one such permanent magnet that will provide satisfactory results in separably holding a ferrous metal automobile gasoline tank cap in position on the nozzle device, as shown by Fig. 1. If desired, a disc-shaped, or other shaped permanent Index I magnet of the single or multiple-pole type may be utilized in the manner of my invention, or a conventional metallic permanent magnet can be substituted which is suitable for this purpose and has sufficient magnetic force to hold a ferrous metal automobile gasoline gas tank cap against the upper surface of the cap 14 as illustrated by Fig. 1.

The outside diameter of the circular magnet 12 is made slightly less than the inside diameter of its seating cavity in the unit section 11, so that the magnet can be readily positioned as shown in Fig. 3. If desired, the magnet 12 may be loosely seated at said location, or fixedly mounted as shown in Fig. 3, by means of a suitable adhesive material A, adapted to hold the magnet in place when applied between the outer side surface of the magnet and inner surface of the unit section 10, as shown.

The modification shown in Fig. 6 comprises a magnetic unit which is in all respects like the unit 10 shown in Fig. 3, except that the unit of Fig. 6 has a snap-on cap element 15 cooperatively combined therewith in separable manner, by means that is structurally well known. Accordingly, to avoid redundancy of description of those parts of the magnetic unit 10 shown in Fig. 6, which correspond with the parts of the magnetic unit of Fig. 3 that have already been described, the same reference characters which designate such parts in Fig. 3 are also applied to the unit shown in Fig. 6.

More particularly, the cap element 15 is made of a non-magnetic material, such as spring brass, a suitable plastic material, etc., and is provided with a slightly yieldable and resilient outwardly flaring annular side wall formation which terminates in an inwardly turned resilient portion 15ª, as shown. This side wall formation is like the side wall formations of the conventional metallic snap-on caps commonly applied to glass fruit jars, vegetable jars and other type jars, or containers. The section 11 of the magnetic unit 10 is provided with an integral annular cam ridge, or cam rib formation 16, that serves as a complementary means for effecting snap-on engagement of the portion 15ª of the cap 15 when the latter is forced downwardly onto the upper end of the unit section 11. Accordingly, the cap 15 is adapted to be separably secured to the magnetic unit 10 shown in Fig. 6, at exactly the same location and for the same purpose as the cap 14 shown in Fig. 3.

From Fig. 1 it will be apparent that an attendant of a gasoline dispensing service station can take the nozzle device to an automobile tank, remove the closure cap C of the latter and quickly and conveniently place it on top of the magnetic unit 10 so that it will be firmly and separably held on the nozzle device until the gasoline tank has been serviced. Since the attendant will have the cap C before his eyes when he withdraws the nozzle device from the automobile gas tank, it is practically impossible for him, because of inadvertency or forgetfulness, to fail in his duty to replace the cap on the tank, as required.

As previously indicated, the nozzle device of my invention shown in Fig. 1, is at all times properly grounded, in conformity with the Underwriters regulations governing the use of such devices. It will be understood, therefore, that the magnetic units shown in Figs. 3 and 6 are also grounded, since they form integral parts of the nozzle device. Accordingly, no electrostatic charge can form on the units 10 and this constitutes an important safety feature of my invention.

It will also be apparent to those skilled in this art that the magnetic unit 10 of my invention can, if desired, be cooperatively associated with some other device, for a similar purpose. For example, the threaded portion 13ᵃ can be connected with the corresponding internally threaded portion of some other device, such as the pipe of an electrical or of a plumbing fixture, so that the magnetic unit 10 will serve to temporarily hold thereagainst, a pipe closure cap, tool, or some other element.

Of course, the nozzle device and magnetic units, specifically shown and described, can be changed and modified in various ways without departing from the invention herein disclosed and more particularly defined by the hereto appended claims.

I claim:

1. A gasoline dispensing nozzle device comprising a valve assembly, a handle for said valve assembly, a tubular gasoline flow directing member connected to said valve assembly, said valve assembly including a magnetic unit structure comprising a spring-retaining well portion having a base portion, a valve spring in said well portion, said spring having one end abutting said base portion, a valve element abutting the other end of said spring and being biased to the closed position thereby, a permanent magnet mounted on said magnetic unit structure, whereby an automobile gas tank cap can be held magnetically and separably when contactingly engaging the outer surface of said magnetic unit structure.

2. A gasoline dispensing nozzle device comprising a valve assembly, a handle for said valve assembly, a tubular, gasoline flow directing member connected to said valve assembly, said valve assembly including a magnetic unit structure comprising a spring-retaining well portion having a base portion, a valve spring in said well portion, said spring having one end abutting said base portion, a valve element abutting the other end of said spring and being biased to the closed position thereby, a permanent magnet mounted on said base portion externally of said well portion, and a cap element detachably mounted on said magnetic unit structure so as to enclose and substantially contact said permanent magnet, whereby an automobile gas tank cap can be held magnetically and separably when contactingly engaging the outer surface of said cap element.

References Cited in the file of this patent

UNITED STATES PATENTS

| | | |
|---|---|---|
| 2,527,681 | Lewis et al. | Oct. 31, 1950 |
| 2,800,931 | Sutcliffe | July 30, 1957 |